United States Patent
Wu et al.

(10) Patent No.: US 10,187,890 B2
(45) Date of Patent: Jan. 22, 2019

(54) APPARATUS AND METHOD FOR CONTROLLING A TUNE-AWAY OPERATION

(71) Applicant: QUALCOMM Incorporated, San Diego, CA (US)

(72) Inventors: Peng Wu, Shanghai (CN); Jun Deng, Shanghai (CN); Xiaochen Chen, Beijing (CN); Tim Liou, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/554,148

(22) PCT Filed: Apr. 14, 2015

(86) PCT No.: PCT/CN2015/076544
§ 371 (c)(1),
(2) Date: Aug. 28, 2017

(87) PCT Pub. No.: WO2016/165071
PCT Pub. Date: Oct. 20, 2016

(65) Prior Publication Data
US 2018/0042014 A1     Feb. 8, 2018

(51) Int. Cl.
*H04W 36/00* (2009.01)
*H04W 88/06* (2009.01)
(Continued)

(52) U.S. Cl.
CPC ....... *H04W 72/0446* (2013.01); *H04W 24/10* (2013.01); *H04W 72/048* (2013.01); *H04W 72/1284* (2013.01); *H04W 88/06* (2013.01)

(58) Field of Classification Search
CPC ............................. H04W 36/00; H04W 88/06
See application file for complete search history.

(56) References Cited

U.S. PATENT DOCUMENTS

| 8,134,977 | B2 | 3/2012 | Parekh et al. |
| 8,738,021 | B2 | 5/2014 | Mutya et al. |

(Continued)

FOREIGN PATENT DOCUMENTS

| CN | 101325808 A | 12/2008 |
| CN | 104221432 A | 12/2014 |

(Continued)

OTHER PUBLICATIONS

International Search Report and Written Opinion—PCT/CN2015/076544—ISAEPO—dated Jan. 20, 2016.

*Primary Examiner* — Ayanah S George
(74) *Attorney, Agent, or Firm* — Norton Rose Fulbright

(57) ABSTRACT

A user equipment (UE) determines a tune-away gap in which the UE performs a tune-away from a first radio access technology (RAT) to a second RAT on a single radio frequency (RF) chain, and transmits an intended-false buffer status report (BSR) to modify a duration of the determined tune-away gap. The intended-false BSR indicates an intended-false value of uplink data pending in a buffer to be transmitted on the first RAT, so that an uplink grant for uplink data transmissions on the first RAT to be received at the UE is modified.

33 Claims, 9 Drawing Sheets

(51) Int. Cl.
  *H04W 72/04* (2009.01)
  *H04W 24/10* (2009.01)
  *H04W 72/12* (2009.01)

(56) References Cited

U.S. PATENT DOCUMENTS

| | | |
|---|---|---|
| 8,886,239 B2 | 11/2014 | Dayal et al. |
| 2013/0215846 A1* | 8/2013 | Yerrabommanahalli .................... H04W 48/18 370/329 |
| 2013/0215869 A1 | 8/2013 | Srinivasan et al. |
| 2013/0295920 A1 | 11/2013 | Viswanadham et al. |
| 2014/0378152 A1 | 12/2014 | Anand et al. |
| 2015/0257057 A1* | 9/2015 | Su .................... H04W 56/0015 370/329 |

FOREIGN PATENT DOCUMENTS

| | | |
|---|---|---|
| WO | WO-2007051184 A2 | 5/2007 |
| WO | WO-2013149015 A1 | 10/2013 |

\* cited by examiner

APPARATUS AND METHOD FOR CONTROLLING A TUNE-AWAY OPERATION

BACKGROUND

Field

Aspects of the present disclosure relate generally to wireless communication systems, and more particularly, to control a tune-away operation in a multi-SIM user equipment.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters.

As the demand for mobile broadband access continues to increase, the use of more than one network or radio access technology (RAT) for wireless communications is becoming more prevalent and devices with the capability of simultaneously accessing multiple RATs are widely available. However, the capability of devices to access multiple RATs creates a contention for RF resources, which results in conflicts between the different RATs. Thus, research continues to advance to meet the growing demand for mobile broadband access and efficient management of communications using multiple RATs.

SUMMARY

In one aspect of the disclosure, a method for wireless communication is disclosed. The method includes determining, by a user equipment (UE), a tune-away gap in which the UE performs a tune-away from a first radio access technology (RAT) to a second RAT on a single radio frequency (RF) chain, and transmitting, by the UE, an intended-false buffer status report (BSR) to modify a duration of the determined tune-away gap. The intended-false BSR indicates an intended-false value of uplink data pending in a buffer to be transmitted on the first RAT, so that an uplink grant for uplink data transmissions on the first RAT to be received at the UE is modified.

In another aspect of the disclosure, a wireless communications apparatus is disclosed. The wireless communications apparatus includes means for determining, by a user equipment (UE), a tune-away gap in which the UE performs a tune-away from a first radio access technology (RAT) to a second RAT on a single radio frequency (RF) chain, and means for transmitting, by the UE, an intended-false buffer status report (BSR) to modify a duration of the determined tune-away gap. The intended-false BSR indicates an intended-false value of uplink data pending in a buffer to be transmitted on the first RAT, so that an uplink grant for uplink data transmissions on the first RAT to be received at the UE is modified.

In still another aspect of the disclosure, a non-transitory computer-readable medium for wireless communication is disclosed. The non-transitory computer-readable medium has program code recorded thereon that. The program code further includes program code for determining, by a user equipment (UE), a tune-away gap in which the UE performs a tune-away from a first radio access technology (RAT) to a second RAT on a single radio frequency (RF) chain, and program code for transmitting, by the UE, an intended-false buffer status report (BSR) to modify a duration of the determined tune-away gap. The intended-false BSR indicates an intended-false value of uplink data pending in a buffer to be transmitted on the first RAT, so that an uplink grant for uplink data transmissions on the first RAT to be received at the UE is modified.

In an additional aspect of the disclosure, an apparatus configured for wireless communication is disclosed. The apparatus includes at least one processor, and a memory coupled to the at least one processor. The at least one processor is configured to determine, by a user equipment (UE), a tune-away gap in which the UE performs a tune-away from a first radio access technology (RAT) to a second RAT on a single radio frequency (RF) chain, and to transmit by the UE, an intended-false buffer status report (BSR) to modify a duration of the determined tune-away gap. The intended-false BSR indicates an intended-false value of uplink data pending in a buffer to be transmitted on the first RAT, so that an uplink grant for uplink data transmissions on the first RAT to be received at the UE is modified.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA. FDMA. OFDMA. SC-FDMA and other networks. The terms "network" and "system" are often used interchangeably. A CDMA network may implement a radio technology such as Universal Terrestrial Radio Access (UTRA). CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB). IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA. E-UTRA, UMTS, LTE. LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
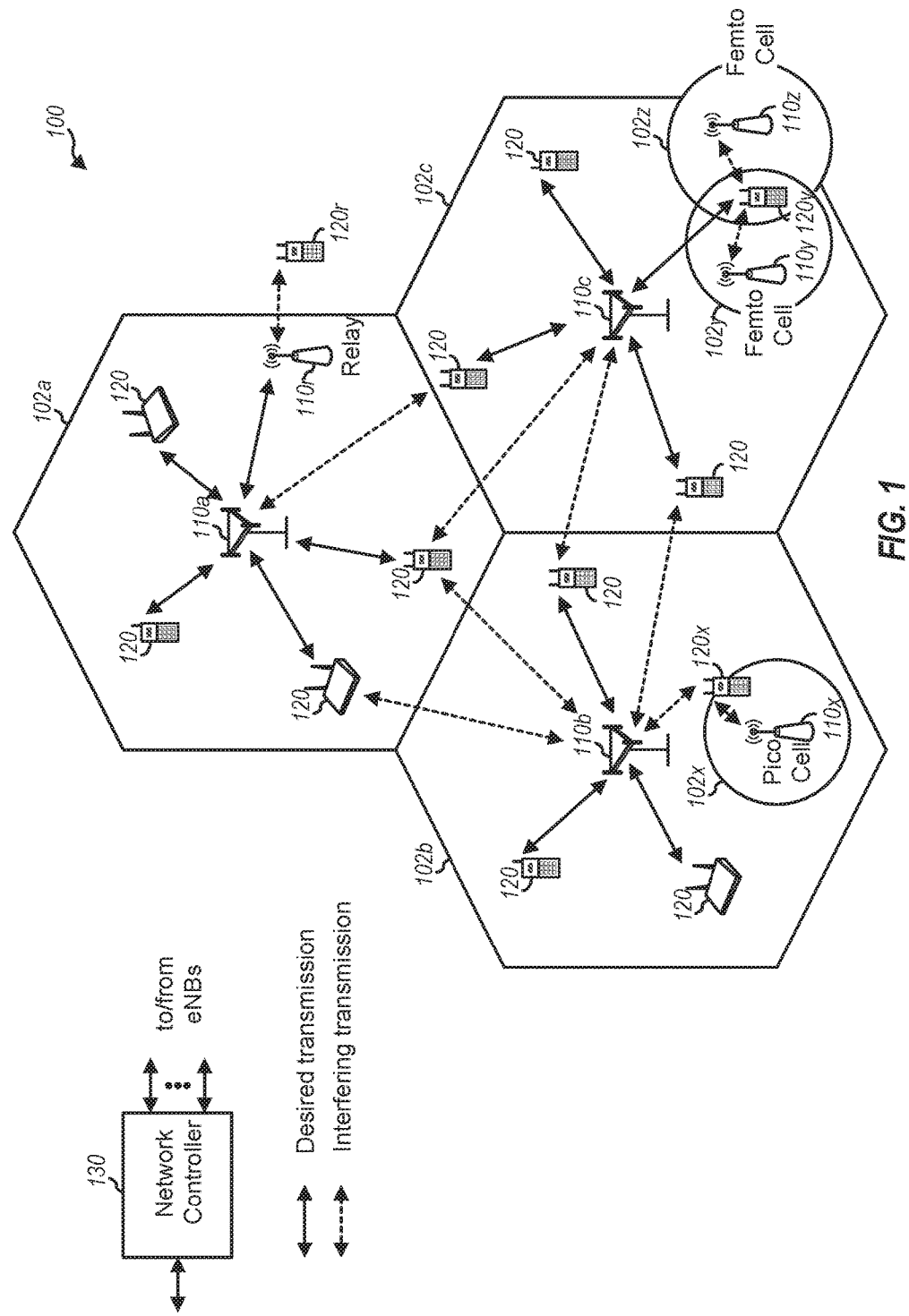
FIG. 1 is a diagram illustrating an example of a telecommunications system.

FIG. 1 shows a wireless communication network 100, which may be an LTE network. The wireless network 100 may include a number of evolved node Bs (eNBs) 110 and other network entities. An eNB may be a station that communicates with the UEs and may also be referred to as a base station, a Node B, an access point, or other term. Each eNB 110a. 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG). UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a smart phone, a tablet, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz. and there may be 1, 2, 4, 8 or 16 subbands for system bandwidth of 1.25, 2.5, 5, 10 or 20 MHz, respectively.

Figure 2:
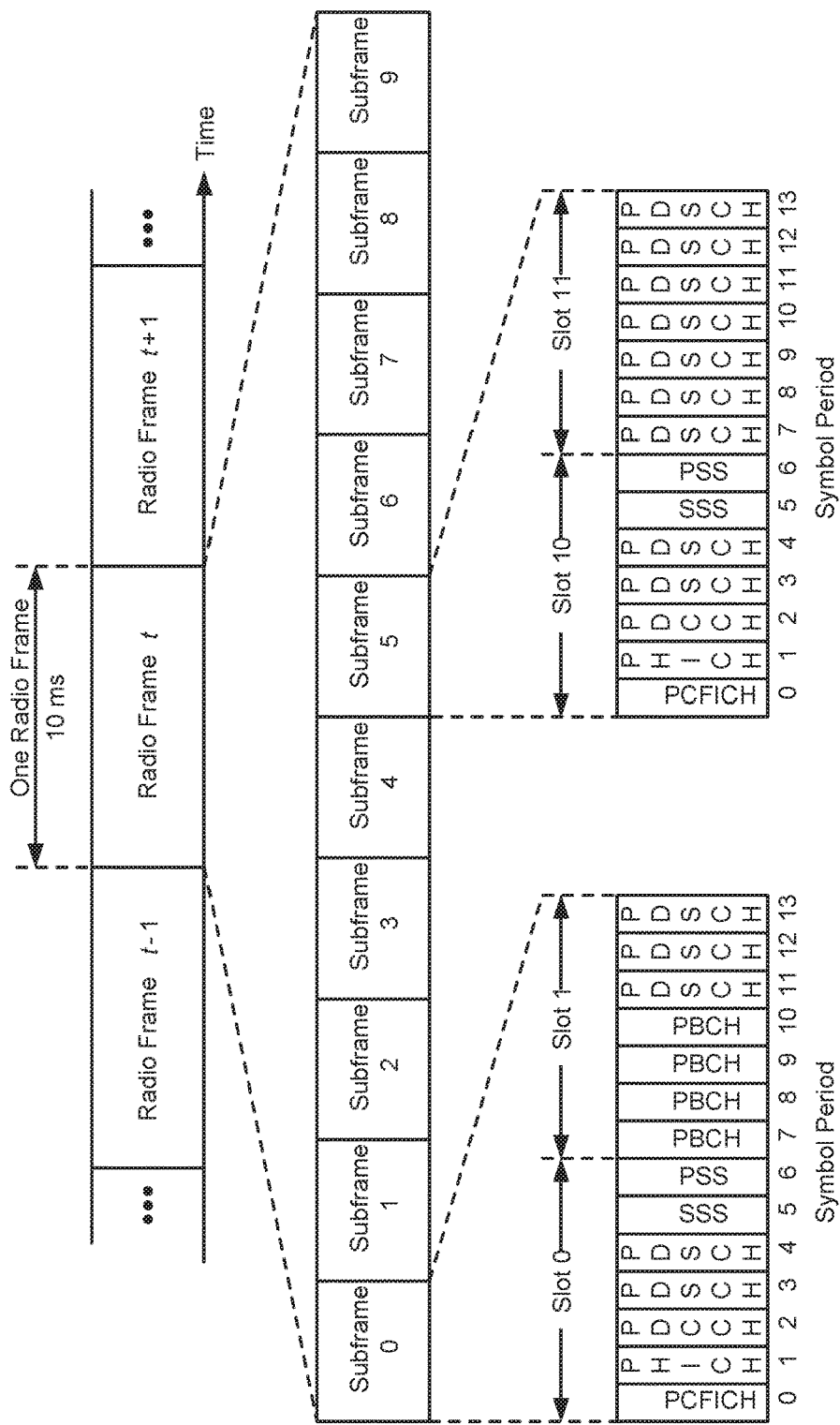
FIG. 2 is a block diagram illustrating an example of a downlink frame structure in a telecommunications system.
Figure 6:
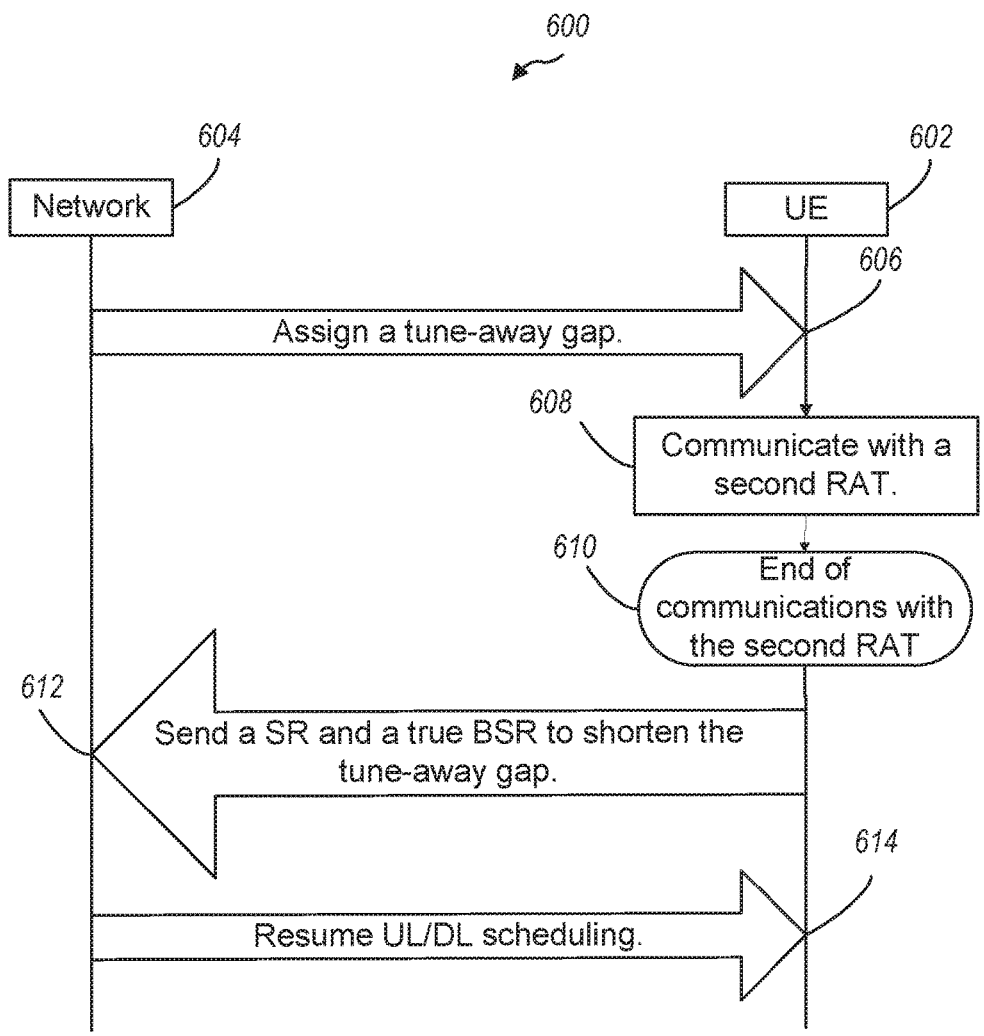
FIG. 6 is a functional block diagram illustrating exemplary blocks executed to implement one aspect of the present disclosure.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
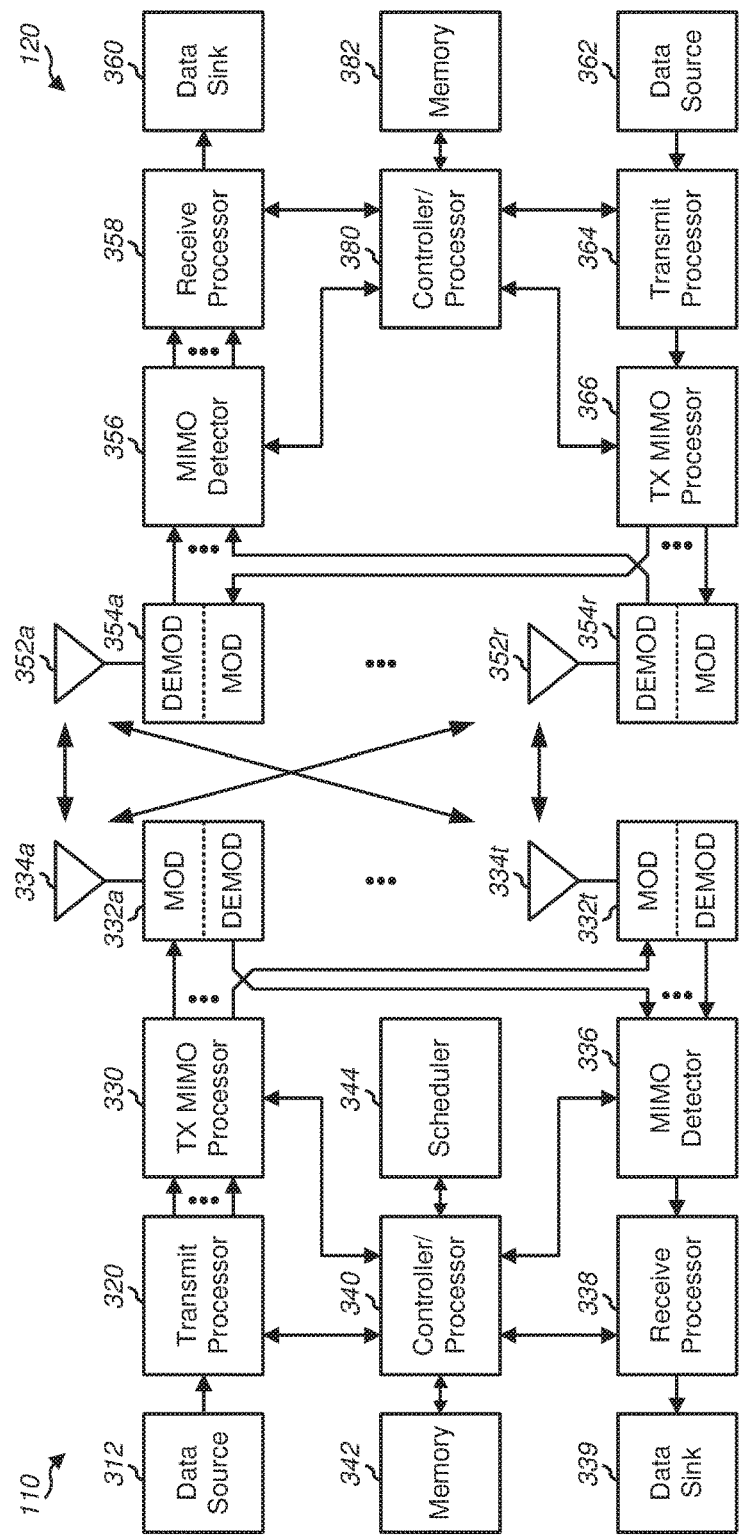
FIG. 3 is a block diagram illustrating a design of a base station and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH. PHICH. PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
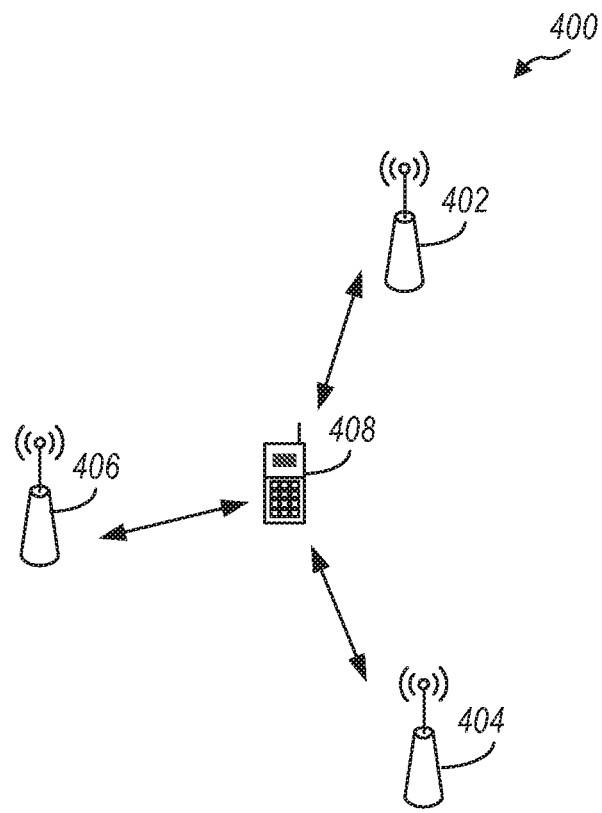
FIG. 4 is a diagram illustrating a wireless network, in which a UE, that is configured according to one aspect of the present disclosure, is located.

FIG. 4 is a diagram illustrating a wireless network 400, in which a UE 408, that is configured according to one aspect of the present disclosure, is located. Wireless network 400 may provide multiple radio access technologies (RATs) across the entire wireless network to UE 408. For example, a base station 402 may provide access to wireless network 400 using LTE/LTE-A, while base stations 404 and 406 may provide access to wireless network 400 using other RATs, such as CDMA, GSM, WCDMA. Time Division Synchronous Code Division Multiple Access (TD-SCDMA), other UTRA or E-UTRA technologies, IEEE 802.11 (Wi-Fi), IEEE 802.16 (WiMAX), IEEE 802.20, broadcast technologies, global positioning technologies, etc. A deployment of mixed RATs may allow mobile operators to provide different services to UE 408 with different technologies. For example, data that requires a higher data transmission rate may be transmitted on LTE, but a voice call may be conducted on GSM.

UE 408 may be a wireless device capable of using multiple RATs. For example, UE 408 may be a dual-SIM-dual-standby (DSDS) device, triple-SIM-triple-standby (TSTS) device, or a device with more subscriber identification modules (hereinafter collectively referred to as a "multi-SIM device"). For example, a multi-SIM device may support both GSM voice and LTE data services, and be commonly referred to as a SVLTE device.

A multi-SIM device may be further categorized by its capacities of handling radio frequency (RF) resources. For example, a multi-SIM device may have multiple RF chains to be able to access a wireless network using multiple RATs at the same time ("multi-radio multi-SIM device"). As a further example, a multi-SIM device may have a single RF chain to access a wireless network using one of the multiple RATs during a given time period ("single-radio multi-SIM device").

RF resources of a multi-radio multi-SIM device may be shared by different RATs. However, band interference may occur due to co-existence of multiple RATs, and may be solved by planning frequency allocations. As to a single-radio multi-SIM device, different RATs may compete with each other to obtain RF resources when conflicts between/among different RATs occur. For example, if data transmissions on LTE conflict with a tune-away gap in which the single-radio multi-SIM device tunes away from LTE to GSM, data transmissions on LTE during the tune-away gap may entirely or partially fail. As a result, large data retransmissions for the data scheduled to be transmitted on LTE during the tune-away gap may be required. Further, due to such bad performance of uplink data transmissions during the tune-away gap, a wireless network may determine the single-radio multi-SIM device has a bad uplink connection, and schedule fewer uplink resources for the single-radio multi-SIM device after the tune-away gap.

A multi-SIM device may have an active session on a first RAT for the majority of a given period while a second RAT or other RATs are in an idle status. Because the multi-SIM device has one or more subscription(s) in addition to the subscription on the first RAT, the multi-SIM device may periodically allow such additional subscription(s) to utilize RF resources. For example, the multi-SIM device may periodically monitor signals and/or acquire connections from the second RAT or other RATs. Such operation may be referred to as a "tune-away." The period for the multi-SIM device to perform a tune-away from the first RAT to the second RAT or other RATs may be referred to as a "tune-away gap." However, a tune-away gap may be initially determined and assigned by a wireless network. As illustrated above, conflicts between data transmissions on a first RAT and a tune-away for a second RAT or other RATs may affect performance and efficiency of uplink transmissions. Therefore, improvements in the operation of tune-away may be beneficial.

Various aspects of the present disclosure provide that a UE may modify a tune-away gap from a first RAT to a second RAT or other RATs by transmitting an intended-false buffer status report (BSR) to a base station in a wireless network. These aspects of the present disclosure may be beneficial to avoid or minimize data transmissions on the first RAT during the tune-away gap. A BSR is a report from the UE indicating data in a buffer pending transmission. An intended-false BSR indicates an intended-false value of data pending in the buffer of the UE. In some aspects of the present disclosure, the tune-away gap may be enlarged. In other aspects of the present disclosure, the tune-away gap may be shortened. In still other aspects of the present disclosure, the tune-away gap may be enabled/created/selected. For clarity, the UE described below is a DSDS UE that is capable of operations with two RATs. It should be noted that the various aspects of the present disclosure are not, in fact, limited to a DSDS UE.

Figure 5:
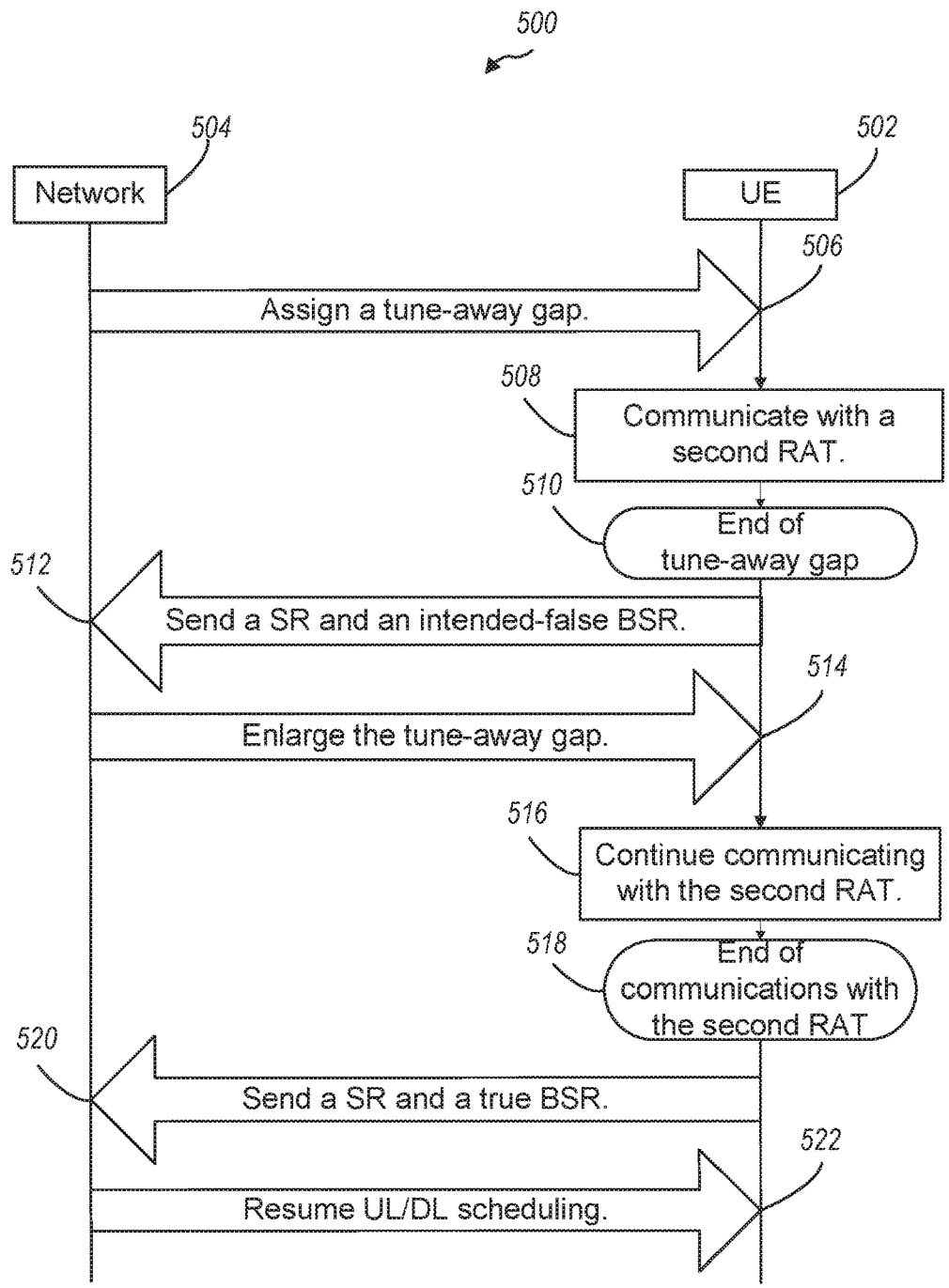
FIG. 5 is a functional block diagram illustrating exemplary blocks executed to implement one aspect of the present disclosure.

FIG. 5 is a functional block diagram 500 illustrating exemplary blocks executed to implement one aspect of the present disclosure, in which a tune-away gap may be enlarged. At operation 506, a network 504 may assign a tune-away gap to a UE 502, in which UE 502 may tune away from a first RAT to a second RAT. For example, UE 502 may tune away from LTE to GSM. UE 502 may monitor pages and other signals from the second RAT during the tune-away gap, and may or may not acquire connections with the second RAT. Network 504 may suspend data scheduling during the tune-away gap. For example, uplink grants for uplink transmissions on the first RAT may be suspended. Additionally, downlink grants for downlink transmissions on the first RAT may also be suspended. Suspension of uplink and/or downlink grants for uplink and/or downlink transmissions may be later lifted by a scheduling request (SR) from UE 502. UE 502 may determine the duration of the tune-away gap based on the assignment of the gap by network 504. At operation 508, UE 502 may communicate with the second RAT until an end of tune-away gap 510.

At or after the end of tune-away gap 510. UE 502 may send an intended-false BSR to network 504, in which UE 502 may provide network 504 with an intended-false value of data pending in a buffer of UE 502 to be transmitted to network 504. In some embodiments, the intended-false BSR may indicate a reduced value of data pending in the buffer to be transmitted after the tune-away gap. In some embodiments, the intended-false BSR may indicate no data pending in the buffer after the tune-away gap. Additionally, UE 502 may transmit an SR to network 504 to request for an uplink grant for transmitting the intended-false BSR. As such, the transmission of the SR for transmitting the intended-false BSR may occur before the transmission of the intended-false BSR.

In response, at operation 514, network 504 may enlarge the tune-away gap because network 504 is informed that no or less uplink data needs to be transmitted on the first RAT after end of the tune-away gap 510. Network 504 may extend the suspension on uplink grants for uplink transmissions on the first RAT to enlarge the tune-away gap. Network 504 may also extend the suspension on downlink grants for downlink transmissions on the first RAT. Additionally, network 504 may respond to the SR from UE 502 with an uplink grant for transmitting the intended-false BSR during suspension on uplink grants and/or downlink grants for uplink and/or downlink data transmissions.

In some embodiments, the tune-away gap may be enlarged from six (6) milliseconds to six hundred (600) milliseconds. Accordingly, conflicts between a tune-away from the first RAT to the second RAT and uplink and/or downlink transmissions on the first RAT during the tune-away gap may be minimized or avoided, because transmissions have been entirely or at least partially suspended during the tune-away gap. Extended suspension on uplink and/or downlink grants for uplink and/or downlink transmissions may be also lifted later by an SR from UE 502.

At operation 516, UE 502 may continue communicating with the second RAT during the enlarged tune-away gap. Then, UE 502 may end communications with the second RAT. At or after an end of communications with the second RAT (indicated by block 518), UE 502 may send a true BSR to network 504, in which UE 502 may provide network 504 with a correct value of data pending in the buffer of UE 502. Additionally, UE 502 may transmit an SR to network 504 to request an uplink grant for transmitting the true BSR. As such, the transmission of the SR for transmitting the true BSR may occur before the transmission of the true BSR.

In response, at operation 522, network 504 may lift the suspension on uplink and/or downlink grants for uplink and/or downlink data transmissions, and resume data scheduling. Accordingly, uplink and/or downlink transmissions on the first RAT may be restored. Additionally, network 504 may respond the SR from UE 502 with an uplink grant for transmitting the true BSR before lifting the suspension on uplink and/or downlink grants for uplink and/or downlink data transmissions.

FIG. 6 is a functional block diagram 600 illustrating exemplary blocks executed to implement one aspect of the present disclosure, in which a tune-away gap may be shortened. At operation 606, a network 604 may assign a tune-away gap to a UE 602, in which UE 602 may tune away from a first RAT to a second RAT. For example, UE 602 may tune away from LTE to GSM, from LTE to TD-SCDMA, from WiMax to GSM, etc. UE 602 may monitor pages and other signals from the second RAT during the tune-away gap, and may or may not acquire connections with the second RAT. Network 604 may suspend data scheduling during the tune-away gap. For example, uplink grants for uplink transmissions on the first RAT may be suspended.

Additionally, downlink grants for downlink transmissions on the first RAT may also be suspended. Suspension on uplink and/or downlink grants for uplink and/or downlink transmissions may be lifted by an SR from UE 602 later. In response, UE 602 may determine the duration of the tune-away gap based on the assignment of tune-away gap by network 604. At operation 608, UE 602 may communicate with the second RAT until an end of communications with the second RAT (indicated by block 610).

Operations 606 through 608 may be similar to operations 506 through 508 as illustrated in FIG. 5. However, instead of enlarging the tune-away gap by sending an intended-false BSR, at operation 612. UE 602 may send a true BSR to network 604 to shorten the tune-away gap before an end of an initially assigned tune-away gap. In some embodiments, the tune-away gap may be fully closed. The reasons to shorten the tune-away gap may include, but not be limited to, matching a shorter period required for monitoring signals from the second RAT, having more data pending to be transmitted on the first RAT, or having urgent data pending to be transmitted on the first RAT. The tune-away gap may be shortened when the first RAT is an advanced wireless communication technology, such as a fifth generation (5G) wireless communication technology. Additionally, UE 602 may transmit an SR to network 604 to request for an uplink grant for transmitting the true BSR. As such, the transmission of the SR for transmitting the true BSR may occur before the transmission of the true BSR.

In response, at operation 614, network 604 may lift the suspension on uplink and/or downlink grants for uplink and/or downlink transmissions, and resume data scheduling. Accordingly, uplink and/or downlink transmissions on the first RAT may be restored. Additionally, network 604 may respond the SR from UE 602 with an uplink grant for transmitting the true BSR before lifting the suspension on uplink and/or downlink grants for uplink and/or downlink data transmissions.

Figure 7:
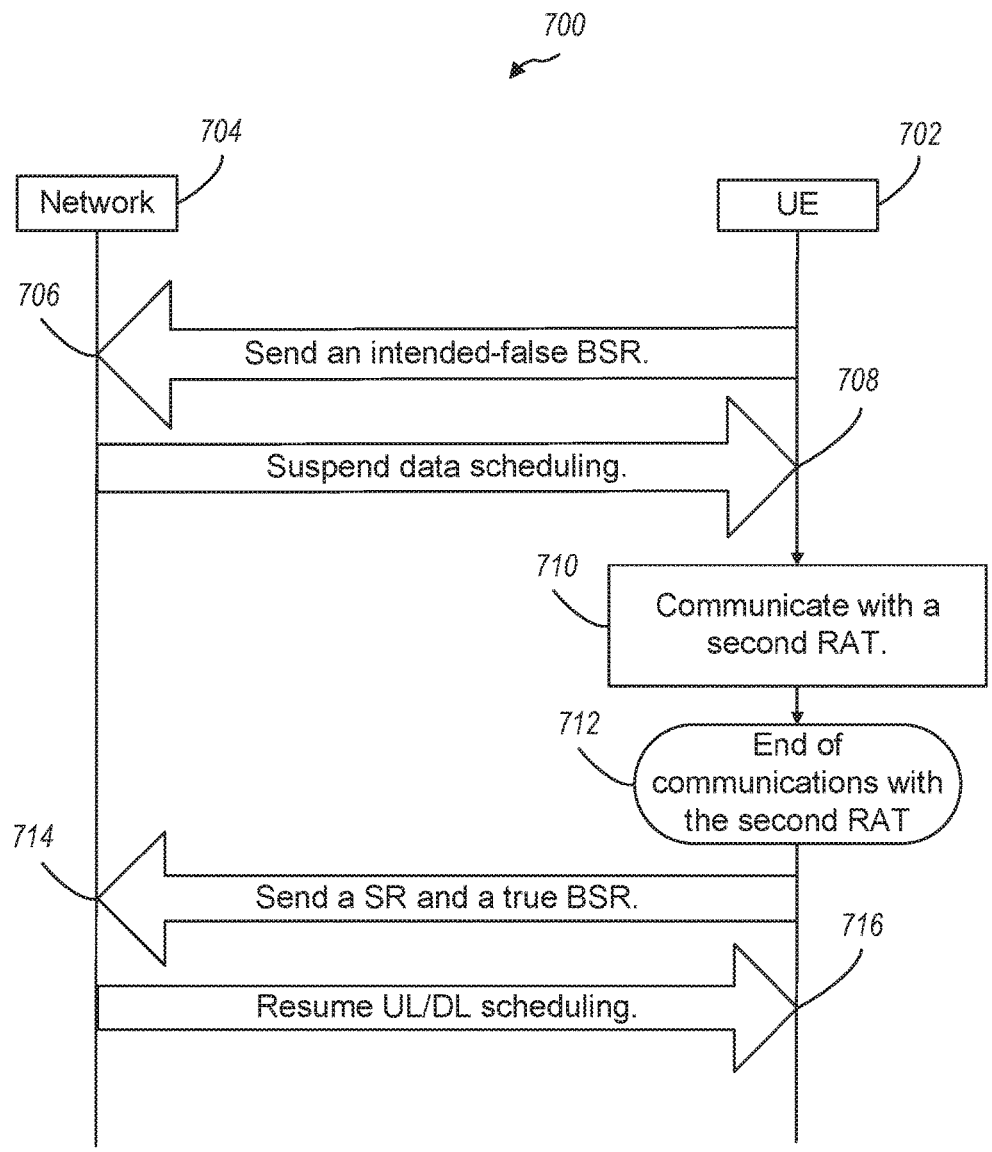
FIG. 7 is a functional block diagram illustrating exemplary blocks executed to implement one aspect of the present disclosure.

FIG. 7 is a functional block diagram 700 illustrating exemplary blocks executed to implement one aspect of the present disclosure, in which a tune-away gap may be enabled/created. At operation 706, a UE 702 may send an intended-false BSR to a network 704, in which UE 702 may provide network 704 with an intended-false value of data pending in a buffer of UE 702 to be transmitted to network 704. In some embodiments, the intended-false BSR may indicate a reduced value of data pending in the buffer. In some embodiments, the intended-false BSR may indicate no data pending in the buffer. In response, at operation 708, network 704 may suspend data scheduling on the first RAT for UE 702 to communicate with the second RAT. For example, network 704 may suspend uplink grants for uplink transmissions. Additionally, network 704 may suspend downlink grants for downlink transmissions. Accordingly, a tune-away gap may be enabled/created. Operations 706 to 708 may be utilized with operation 506 in FIG. 5 and operation 606 in FIG. 6 as illustrated above.

In some embodiments, under advanced wireless communication technologies, such as LTE or LTE-A, one tune-away gap may be selected from a plurality of tune-away gaps with different durations based on the intended-false BSR. The plurality of tune-away gaps may be pre-determined by network 704. UE 702 may select different tune-away gaps by transmitting different intended-false BSR with different intended-false values of data pending in the buffer of UE 702. Accordingly, the period of time network 704 may suspend data scheduling on the first RAT depends on the intended-false BSR and selected tune-away gap.

With the tune-away gap being enabled/created, at operation 710, UE 702 may communicate with the second RAT during the tune-away gap, and then, UE 702 may end communications with the second RAT. Because transmissions have been entirely or at least partially suspended during the tune-away gap, as illustrated above, conflicts between the tune-away from the first RAT to the second RAT and uplink and/or downlink transmissions on the first RAT during the tune-away gap may be minimized or avoided.

At or after an end of communications with the second RAT (indicated by block 712), at operation 714, UE 702 may send a true BSR to network 704, in which UE 702 may provide network 704 with a correct value of data pending in the buffer of UE 702. Additionally, UE 702 may transmit an SR to network 704 to request for an uplink grant for transmitting the true BSR. As such, the transmission of the SR for transmitting the true BSR may occur before the transmission of the true BSR. In response, at operation 716, network 704 may lift the suspension on uplink and/or downlink grants for uplink and/or downlink transmissions, and resume data scheduling. Accordingly, uplink and/or downlink transmissions on the first RAT may be restored. Additionally, network 704 may respond the SR from UE 702 with an uplink grant for transmitting the true BSR before lifting the suspension on uplink and/or downlink grants for uplink and/or downlink data transmissions.

Figure 8:
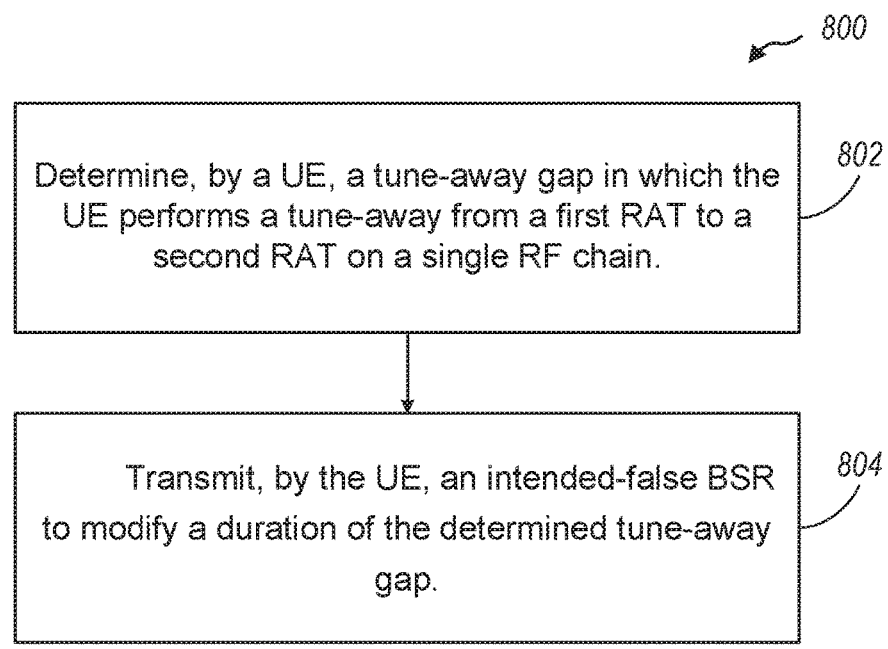
FIG. 8 is a functional block diagram illustrating exemplary blocks executed to implement one aspect of the present disclosure.

FIG. 8 is a functional block diagram 800 illustrating exemplary blocks executed to implement one aspect of the present disclosure. At block 802, a UE may determine a tune-away gap in which the UE performs a tune-away from a first RAT to a second RAT on a single RF chain. During the tune-away gap, the UE may monitor or perform measurements on pages or signals from the second RAT utilizing a single RF resource. At block 804, the UE may transmit an intended-false BSR to modify a duration of the determined tune-away gap by transmitting an intended-false BSR. Such intended-false BSR may be transmitted after the UE entering the determined tune-away gap. The intended-false BSR may inform a network of an intended-false value of data pending in a buffer of the UE, such as a reduced value of data pending in the buffer or no data pending in the buffer. Accordingly, the network may suspend or reduce an uplink grant for uplink data transmissions on the first RAT. Correspondingly, the UE may receive a modified uplink grant. As a result, uplink transmissions on the first RAT during the modified tune-away gap may be entirely or at least partially suspended, and, thus, conflicts between uplink transmissions on the first RAT during the modified tune-away gap and a tune-away operation from the first RAT to the second RAT may be avoided or at least minimized.

In some aspects of the present disclosure, the UE may send a true BSR, in which the UE may provide the network with a correct value of data pending in the buffer of the UE. The true BSR may be sent to the network during or at the end of the modified tune-away gap. In response, the network may lift the suspension on the uplink grant for uplink data transmissions, and resume data scheduling. Accordingly, uplink transmissions on the first RAT may be restored. If the true BSR is sent to the network during the modified tune-away gap, the modified tune-away gap may be shortened. Correspondingly, uplink transmissions on the first RAT may be restored sooner.

In other aspects of the present disclosure, the UE may further send an additional intended-false BSR after uplink transmissions on the first RAT being restored, in order to enable/create a next tune-away gap. As illustrated above with respect to FIG. 7, one tune-away gap may be selected from a plurality of tune-away gaps with different durations based on the additional intended-false BSR. The UE may select different tune-away gaps by transmitting different intended-false BSR with different intended-false values of data pending in the buffer of the UE.

Figure 9:
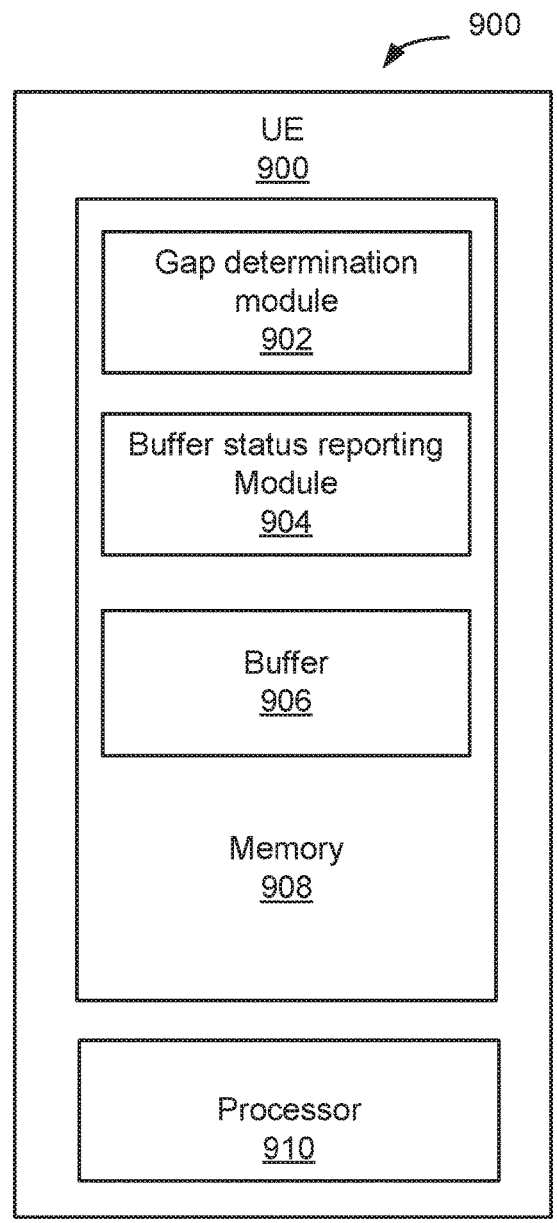
FIG. 9 is a functional block diagram of a UE in a communication network according to one aspect of the present disclosure.

FIG. 9 is a functional block diagram of a UE 900 in a communication network according to one aspect of the present disclosure. UE 900 may include a memory 908 that may store data and program codes for execution of a gap determination module 902 and a buffer status reporting module 904, and may include a buffer 906 for storing data pending to be transmitted. Gap determination module 902 may be used to initially determine the duration or length of a tune-away gap assigned by a network (not shown in FIG. 9). Buffer status reporting module 904 may be used to determine and issue a true or intended-false BSR, as illustrated above in connection with FIGS. 5-8, in order to modify the duration of the initially assigned tune-away gap. A true BSR may indicate a correct value of data pending in buffer 906 to be transmitted, and may be used to resume uplink transmissions on a first RAT after a tune-away gap from the first RAT to a second RAT. An intended-false BSR may indicate an intended-false value of data pending in buffer 906 to be transmitted. The intended-false value of data pending in buffer 906 may modify a total duration or length of the tune-away gap or determine a duration of a next tune-away gap.

UE 900 may also include a processor 910 to perform or execute program codes that are stored in memory 908 and control the other components of UE 900. Processor 910 and/or other processors at UE 900 may also perform or direct the execution of the functional blocks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising: determining, by a user equipment (UE), a tune-away gap in which the UE performs a tune-away from a first radio access technology (RAT) to a second RAT on a single radio frequency (RF) chain; and transmitting, by the UE, an intended-false buffer status report (BSR) to modify a duration of the determined tune-away gap, wherein the intended-false BSR indicates an intended-false value of uplink data pending in a buffer to be transmitted on the first RAT, so that an uplink grant for uplink data transmissions on the first RAT to be received at the IJE is modified.

2. The method of claim 1, wherein the transmitting the intended-false BSR to modify the duration of the determined tune-away gap includes transmitting the intended-false BSR to enlarge the determined tune-away gap at the end of the determined tune-away gap.

3. The method of claim 2, wherein the intended-false BSR indicates reduced uplink data pending in the buffer to be transmitted after the determined tune-away gap.

4. The method of claim 1, further comprising transmitting a scheduling request for an uplink grant for transmission of the intended-false BSR.

5. The method of claim 1, further comprising transmitting a true BSR indicating a true value of uplink data pending in the buffer to restore the uplink data transmissions on the first RAT.

6. The method of claim 5, wherein the true BSR is transmitted during the determined tune-away gap to shorten the determined tune-away gap.

7. The method of claim 1, further comprising enabling a next tune-away gap by transmitting an additional intended-false BSR.

8. The method of claim 7, wherein the enabling includes selecting the next tune-away gap from a plurality of tune-away gaps with different durations.

9. The method of claim 1, wherein the tune-away is autonomously initiated by the IE.

10. A wireless communications apparatus, comprising: means for determining, by a user equipment (UE), a tune-away gap in which the UE performs a tune-away from a first radio access technology (RAT) to a second RAT on a single radio frequency (RF) chain; and means for transmitting, by the UE, an intended-false buffer status report (BSR) to modify a duration of the determined tune-away gap, wherein the intended-false BSR indicates an intended-false value of uplink data pending in a buffer to be transmitted on the first RAT, so that an uplink grant for uplink data transmissions on the first RAT to be received at the UE is modified.

11. The wireless communications apparatus of claim 10, wherein the means for transmitting the intended-false BSR to modify the duration of the determined tune-away gap includes means for transmitting the intended-false BSR to enlarge the determined tune-away gap at the end of the determined tune-away gap.

12. The wireless communications apparatus of claim 11, wherein the intended-false BSR indicates reduced uplink data pending in the buffer to be transmitted after the determined tune-away gap.

13. The wireless communications apparatus of claim 10, further comprising means for transmitting, by a user equipment, a true BSR indicating a true value of uplink data pending in the buffer to restore the uplink data transmissions on the first RAT.

14. The wireless communications apparatus of claim 13, wherein the true BSR is transmitted during the determined tune-away gap to shorten the determined tune-away gap.

15. The wireless communications apparatus of claim 10, wherein the tune-away is autonomously initiated by the UE.

16. A non-transitory computer-readable medium having program code recorded thereon for wireless communication, the program code comprising: program code for determining. by a user equipment (UE), a tune-away gap in which the UE performs a tune-away from a first radio access technology (RAT) to a second RAT on a single radio frequency (RF) chain; and program code for transmitting, by the UE, an intended-false buffer status report (BSR) to modify a duration of the determined tune-away gap, wherein the intended-false BSR indicates an intended-false value of uplink data pending in a buffer to be transmitted on the first RAT, so that an uplink grant for uplink data transmissions on the first RAT to be received at the UE is modified.

17. The non-transitory computer-readable medium of claim 16, wherein the program code for transmitting the intended-false BSR to modify the duration of the determined tune-away gap includes program code for transmitting the intended-false BSR to enlarge the determined tune-away gap at the end of the determined tune-away gap.

18. The non-transitory computer-readable medium of claim 17, wherein the intended-false BSR indicates reduced uplink data pending in the buffer to be transmitted after the determined tune-away gap.

19. The non-transitory computer-readable medium of claim 16, further comprising program code for transmitting a scheduling request for an uplink grant for transmission of the intended-false BSR.

20. The non-transitory computer-readable medium of claim 16, further comprising program code for transmitting a true 13SR indicating a true value of uplink data pending in the buffer to restore the uplink data transmissions on the first RAT.

21. The non-transitory computer-readable medium of claim 20, wherein the true BSR is transmitted during the determined tune-away gap to shorten the determined tune-away gap.

22. The non-transitory computer-readable medium of claim 16, further comprising program code for enabling a next tune-away gap by transmitting an additional intended-false BSR.

23. The non-transitory computer-readable medium of claim 22, wherein the program code for enabling includes program code for selecting the next tune-away gap from a plurality of tune-away gaps with different durations.

24. The non-transitory computer-readable medium of claim 16, wherein the tune-away is autonomously initiated by the UE.

25. An apparatus configured for wireless communication, comprising: at least one processor; and a memory coupled to the at least one processor, wherein the at least one processor is configured to: determine, by a user equipment (UE), a tune-away gap in which the UE performs a tune-away from a first radio access technology (RAT) to a second RAT on a single radio frequency (RF) chain; and transmit, by the UE, an intended-false buffer status report (BSR) to modify a duration of the determined tune-away gap, wherein the intended-false BSR indicates an intended-false value of uplink data pending in a buffer to be transmitted on the first RAT, so that an uplink grant for uplink data transmissions on the first RAT to be received at the UE is modified.

26. The apparatus of claim 25, wherein the configuration of the at least one processor to transmit the intended-fake BSR to modify the duration of the determined tune-away gap includes configuration to transmit the intended-false BSR to enlarge the determined tune-away gap at the end of the determined tune-away gap.

27. The apparatus of claim 26, wherein the intended-false BSR indicates reduced uplink data pending in the buffer to be transmitted after the determined tune-away gap.

28. The apparatus of claim 25, wherein the at least one processor is further configured to transmit a scheduling request for an uplink grant for transmission of the intended-false BSR.

29. The apparatus of claim 25, wherein the at least one processor is further configured to transmit a true BSR indicating a true value of uplink data pending in the buffer to restore the uplink data transmissions on the first RAT.

30. The apparatus of claim 29, wherein the true BSR is transmitted during the determined tune-away gap to shorten the determined tune-away gap.

31. The apparatus of claim 25, wherein the at least one processor is further configured to enable a next tune-away gap by transmitting an additional intended-false BSR.

32. The apparatus of claim 31, wherein the configuration of the at least one processor to enable includes configuration to select the next tune-away gap from a plurality of tune-away gaps with different durations.

33. The apparatus of claim 25, wherein the tune-away is autonomously initiated by the UE.

\* \* \* \* \*